US008563791B2

(12) United States Patent
Anderson et al.

(10) Patent No.: US 8,563,791 B2
(45) Date of Patent: *Oct. 22, 2013

(54) PROCESS FOR THE DISSOLUTION OF COAL, BIOMASS AND OTHER ORGANIC SOLIDS IN SUPERHEATED WATER

(75) Inventors: Kenneth B. Anderson, Carbondale, IL (US); John C. Crelling, Carbondale, IL (US); William W. Huggett, Herrin, IL (US)

(73) Assignee: Southern Illinois University Carbondale, Carbondale, IL (US)

(*) Notice: Subject to any disclaimer, the term of this patent is extended or adjusted under 35 U.S.C. 154(b) by 132 days.

This patent is subject to a terminal disclaimer.

(21) Appl. No.: 13/148,237

(22) PCT Filed: Feb. 11, 2010

(86) PCT No.: PCT/US2010/023886
§ 371 (c)(1),
(2), (4) Date: Aug. 5, 2011

(87) PCT Pub. No.: WO2010/093785
PCT Pub. Date: Aug. 19, 2010

(65) Prior Publication Data
US 2011/0289827 A1 Dec. 1, 2011

Related U.S. Application Data

(60) Provisional application No. 61/151,677, filed on Feb. 11, 2009.

(51) Int. Cl.
*C10L 1/18* (2006.01)
*C07C 1/00* (2006.01)
*C10G 3/00* (2006.01)

(52) U.S. Cl.
USPC ............... 585/3; 585/240; 585/241; 208/428

(58) Field of Classification Search
USPC ............ 585/3, 240, 241, 469, 648, 733; 208/390, 400, 428, 435, 423
See application file for complete search history.

(56) References Cited

U.S. PATENT DOCUMENTS 5,326,456 A 7/1994 Brons et al.
5,997,751 A * 12/1999 Higo et al. ............... 210/758

(Continued)

FOREIGN PATENT DOCUMENTS

JP 2003236491 A * 8/2003
JP 2003236569 A * 8/2003
WO WO20100093785 8/2010

OTHER PUBLICATIONS

"Oxidative Hydrothermal Dissolution of Illinois Coal" Dr. Ken B Anderson, William W. Huggett and Paul E Kaelin Final Technical Report Sep. 1, 2005 through Oct. 31, 2006 (available online Dec. 3, 2008).*

(Continued)

*Primary Examiner* — Pamela H Weiss
(74) *Attorney, Agent, or Firm* — Polsinelli PC

(57) ABSTRACT

A process of solubilizing organic solids that includes reacting an organic solid with an oxidant in superheated water to form a solubilized organic solute. Preferably, the organic solid is selected from the group consisting of coal, lignite, kerogen, biomass, solid organic wastes, and mixtures thereof. The oxidant preferably is molecular oxygen.

37 Claims, 13 Drawing Sheets

(56) References Cited

U.S. PATENT DOCUMENTS

| | | |
|---|---|---|
| 7,259,257 B2 | 8/2007 | Schlesiger et al. |
| 7,692,050 B2 | 4/2010 | Adams et al. |
| 2002/0003115 A1 | 1/2002 | Conaway |
| 2003/0168381 A1 | 9/2003 | Hokari et al. |
| 2004/0192980 A1 | 9/2004 | Appel et al. |
| 2004/0232046 A1 | 11/2004 | Tanaka et al. |
| 2007/0144941 A1 | 6/2007 | Hokari et al. |
| 2008/0283472 A1 | 11/2008 | Scott et al. |
| 2010/0108567 A1 | 5/2010 | Medoff |

OTHER PUBLICATIONS

Machine Translation JP2003236569A.*
Machine Translation JP2003236491A.*
International Search Report and Written Opinion for International Application No. PCT/US12/40746 dated Aug. 28, 2012.
Supplementary European Search Report for European Application No. EP10741721 dated Feb. 7, 2012.
European Search Report for Application No. EP10741721 dated Feb. 7, 2012.
International Search Report for Application No. PCT/US2010/023886 dated Sep. 20, 2010.
Siskin et al., Reactivity of Organic Compounds in Superheated Water: General Background, Chemical Reviews, Apr. 2001, vol. 101, pp. 825-836.
Williams et al., Subcritical and Superficial Water Gasification of Cellulose, Starch, Glucose and Biomass Waste, Energy and Fuels, vol. 20, No. 3, Apr. 12, 2006, pp. 1259-1265.

* cited by examiner

PROCESS FOR THE DISSOLUTION OF COAL, BIOMASS AND OTHER ORGANIC SOLIDS IN SUPERHEATED WATER

Priority to U.S. Provisional Application No. 61/151,677, filed Feb. 11, 2009, the disclosure of which is hereby incorporated by reference in its entirety, is claimed.

FIELD OF THE INVENTION

The invention relates generally to dissolving organic solids. More specifically, the invention relates to processes that solubilize organic solids by reacting an organic solid, such as coal or biomass, with an oxidant in superheated water.

BACKGROUND

As energy independence becomes more important, there is a need to replace petroleum with other sources of energy. These sources can include, for example, solar, wind, nuclear, coal, and biomass. Global coal resources exceed petroleum resources and are much more uniformly distributed geographically. However, conventional coal utilization technologies often result in undesirable environmental impacts.

Coal is a complex, heterogeneous material based on an insoluble macromolecular structure. Recovery of valuable chemical products from this starting material is challenging, due in large part to the heterogeneity and complexity of the coal structure and also due to its generally-accepted insoluble nature, which limits potential processing and "refining" options that are available for other feed stocks. Most traditional coal utilization strategies are based on recovery of energy, either directly as heat or more typically at a commercial scale, as electricity. Coal is mined, cleaned to remove as much inorganic material as is practical, and burned in one of a variety of combustion systems to generate heat used to produce steam, which is used for electrical generation.

Gasification involves conversion of coal to syngas (CO+ $H_2$) followed by utilization of the syngas for electrical generation (IGCC) or production of synthetic liquids (Fischer-Tropsch/indirect liquefaction). Liquid products can also be produced from coal by pyrolysis, often in conjunction with metallurgical coke production. At one time, the coal tar industry was a major source of raw chemical feedstocks, but declining demand for coke, the relatively low quality of coal tars (for refining purposes) and the heretofore low cost of petroleum-derived fuels have reduced commercial-scale production of chemical feedstocks from coal tars.

Direct liquefaction technology has been extensively explored. This utilization strategy was largely aimed at production of synthetic petroleum-substitutes for production of transportation fuels. The concept underlying this approach was conversion of coal to liquid products by limited disruption of the macromolecular structure of the coal by reductive bond breaking. This was typically accomplished by processing of the coal with $H_2$, usually at high pressures and moderately high temperatures, often in conjunction with a carrier solvent and usually in conjunction with catalytic materials. This technology was never successfully demonstrated to be an economically viable route for conversion of coal to useful products and much of this effort was abandoned.

In addition to the technologies for converting coal into useful energy referred to above, there are processes involving supercritical water oxidation for destruction of wastes. A supercritical fluid is any fluid at a temperature and pressure above its thermodynamic critical point. Supercritical water oxidation is designed for complete oxidation of the organic material and is generally employed for the destruction of hazardous waste.

In addition to coal, studies have demonstrated the partial conversion of switchgrass to lower molecular products using subcritical water. At 235° C., it was found that up to 51.1% of the weight of the carbon present in the switchgrass could be converted. Kumar et al., Biocrude Production from Switchgrass Using Subcritical Water, Energy Fuels 23: 5151-5159 (2009). In addition, conversions up to 54.8% by weight of the initial mass at 250° C. and up to 78.9% by weight at 300° C. were obtained for switchgrass in a batch reactor. Cheng et al., Investigation of Rapid Conversion of Switchgrass in Subcritical Water, Fuel Process Tech. 90: 301-311 (2009).

Coal is a critical global resource in a time when energy independence is becoming more important. Global coal resources exceed petroleum resources by a factor of more than 10 and coal is much more uniformly geographically distributed that petroleum. However, utilization of coal and other organic solids is inhibited by the fact that they are solid and associated with a wide range of environmental problems. Prior technologies have failed to solve these problems. Therefore, an environmentally benign conversion of organic solids, such as coal, to a liquid that can be pumped, distilled, or otherwise processed by conventional liquid processing technology is a long-standing technological goal.

SUMMARY

Disclosed herein is a process of solubilizing organic solids that includes reacting an organic solid with an oxidant in superheated water to form at least one solubilized organic solute. Also disclosed is the solubilized organic solute resulting from the disclosed process. The organic solid preferably is selected from the group consisting of coal, lignite, kerogen, biomass, solid organic wastes and mixtures thereof. Biomass preferably is selected from the group consisting of wood, grasses, grains, and mixtures thereof. The organic solid preferably has a small particle size to provide greater surface area for the reaction of the organic solid with the oxidant.

The oxidant can be any oxidant capable of oxidizing the organic solid, such as molecular oxygen ($O_2$). The molecular oxygen preferably is derived from hydrogen peroxide.

The superheated water preferably has a temperature above 100° C. to about 374° C., and is preferably about 200° C. to about 350° C. The pressure in the reactor should be sufficient to maintain the liquid state of the water. For example, the pressure preferably is about 100 Pa to about 22 MPa, more preferably at about 1.5 MPa to about 17 MPa, and most preferably at about 12 MPa to about 16 MPa.

The process can further comprise reacting the organic solid with the oxidant in a reactor having no head space above the superheated water. The process can further include chilling the solubilized organic solute. The solubilized organic solute preferably is chilled to about 20° C.

The process preferably proceeds to completion resulting in little or no solid coal or biomass after the oxidation reaction. Preferably, more than 50% of the organic solid is recoverable as a solubilized organic solute; for example, more than 70%, more than 90%, or more than 95% of the organic solid is recoverable as a solubilized organic solute. The solubilized organic solute can have a pH of about 1 to about 5.

Additional features of the invention may become apparent to those skilled in the art from a review of the following detailed description, taken in conjunction with the drawings, the examples, and the appended claims.

BRIEF DESCRIPTION OF THE DRAWINGS

For a more complete understanding of the disclosure, reference should be made to the following detailed description and accompanying drawing wherein.

Figure 1:
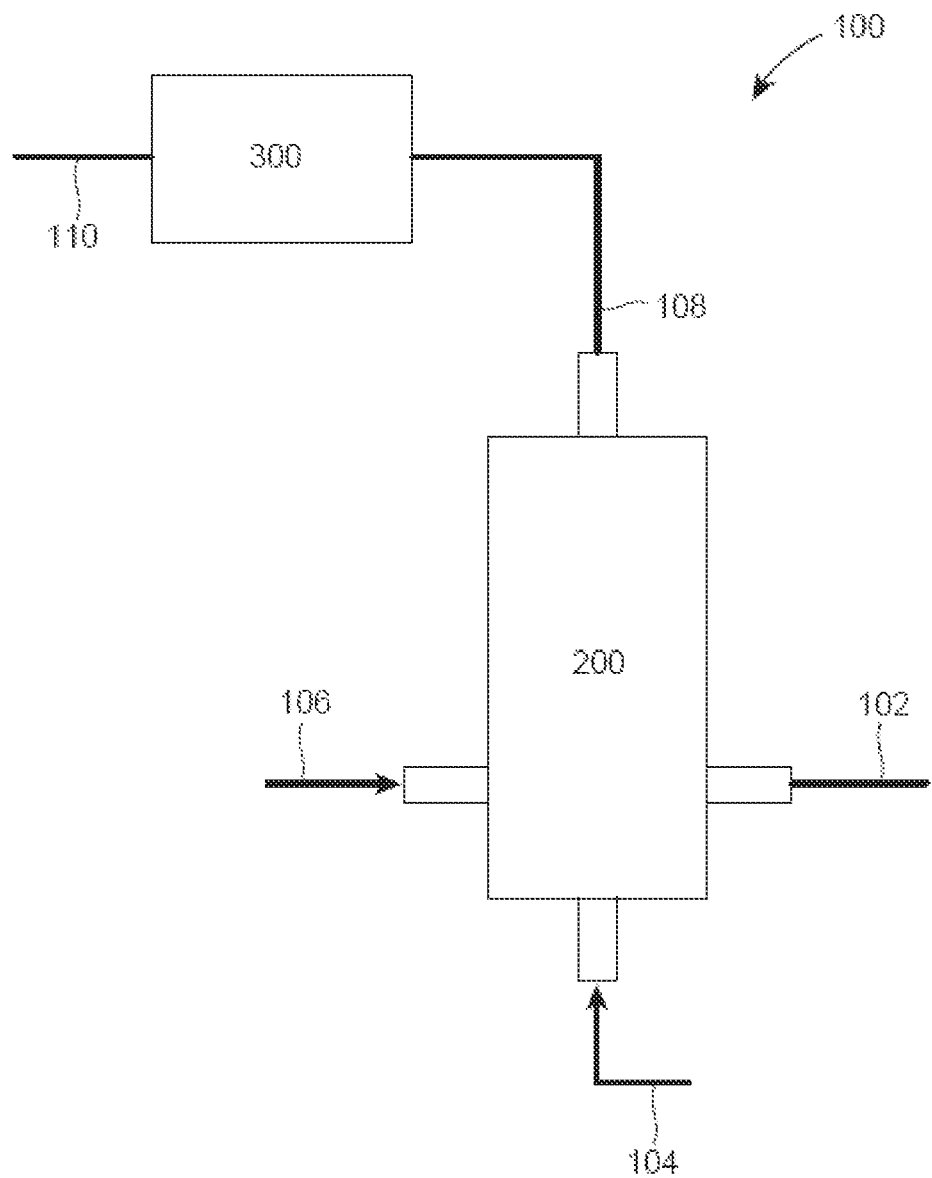
FIG. 1 is schematic of the oxidation process generally.

While the disclosed process for solubilizing organic solids is susceptible of embodiments in various forms, there are illustrated in the drawings (and are described below) specific embodiments of the invention, with the understanding that the disclosure is intended to be illustrative, and is not intended to limit the invention to the specific embodiments described and illustrated herein.

DETAILED DESCRIPTION

The invention relates generally to processes for producing water-soluble products from organic solids, preferably coal. The process includes reacting an organic solid with an oxidant in a reactor containing superheated water to form at least one solubilized organic solute. The reaction breaks down the macromolecular structure of the organic solid, which would otherwise not be soluble in water, into lower molecular weight fragments. These lower molecular weight fragments are soluble in water. These water-soluble fragments are referred to as dissolved organic solids, solubilized organics, or solubilized organic solutes. The solubilized fragments can then be used as chemical feedstock or as liquid fuel.

Some organic solids include, for example, coal, lignite, kerogen, biomass, and solid organic wastes. Biomass is biological material derived from living organisms and includes, for example, plant-based materials such as wood, grasses, and grains. For example, a solid organic waste can be waste plastics. Coal, for example, has a complex, high molecular weight macromolecular structure made up of numerous cross-linked aromatic and aliphatic sub-structures. It is believed that coal is insoluble in water primarily because of the extent of cross-linking present between different parts of this structure. Disruption of cross-linking structural elements in organic solids breaks the structure into smaller sub-structural units. For example, according to the disclosed methods, coal can be converted into a new product with modified physical properties. In addition, the disclosed process was found to be effective for biomass; very rapid and complete conversion to soluble organics was easily achievable.

The oxidant can be any oxidant capable of oxidizing the organic solid, and preferably is molecular oxygen ($O_2$). The use of molecular oxygen as an oxidant avoids the use of exotic oxidants, such as metal oxides like permanganate or chromate oxides and organic peroxides. These exotic oxidants can be harmful to the environment and/or expensive. Molecular oxygen can be extracted from air using any known method, such as fractional distillation of liquefied air or electrolysis of water. The molecular oxygen can also be derived from the in situ decomposition of hydrogen peroxide. Alternatively, molecular oxygen can be supplied directly to the reactor. The addition of the oxidant to the superheated water increases the rate of conversion and the overall percent conversion of the organic solid to solubilized products.

The reaction media is superheated water having a temperature preferably above 100° C. to about 374° C., more preferably about 200° C. to about 350° C. The pressure in the reactor should be sufficient to maintain the water in the liquid state (without water loss into a gas phase). For example, the pressure can be more than 100 Pa (Pascal) to about 22 MPa, preferably at about 1.5 MPa to about 17 MPa, and more preferably at about 12 MPa to about 16 MPa. Hydrothermal and superheated water have been used interchangeably throughout the specification.

It is believed that the oxidation reaction is a surface reaction of the oxidant and the organic solid surface. Therefore, maintaining sufficient surface-area-to-volume ratio of the organic solid is important to the rate of the reaction. The organic solid preferably has a small particle size to provide greater surface area per volume for the reaction. However, the organic solid can be any size, and the reaction will progress. Without intending to be bound by theory, it is believed that the reaction begins at the surface and etches away until the solid is dissolved or until the reaction is halted.

The disclosed processes can include the addition of other components to the reaction, such as, for example, pH modifiers, catalysts, or additional solvents. It is contemplated that these additives could promote the formation of particular desired products or minimize the formation of undesirable products.

The process can further include chilling the solubilized organic solute, depending on the next step in the processing. One advantage of chilling the solubilized organic solute is to prevent further oxidation of the solubilized organic solute. Preferably, the solubilized organic solute can be chilled to room temperature or approximately 20° C. However, further processing, such as distillation, evaporation, or further reaction of the dissolved organics, may not require cooling. In this case, chilling may not be desirable.

FIG. 1 shows a schematic diagram of the oxidation process described herein. Coal, or other organic solid, can be loaded in a reactor 120. To achieve the full advantage of the process, the reactor 120 may be an up-flow reactor with no gaseous head space. Importantly, the reactor can include various configurations, however, it is preferred that there is no gaseous head space. Superheated water is flowed into the reactor 120 through a port 102 until equilibration is reached. An oxidant, for example, molecular oxygen, is flowed through a port 104. For example, molecular oxygen can be supplied directly or molecular oxygen can be generated by thermal decomposition of hydrogen peroxide prior to addition to the reactor. A port 106 can be used for any other components if added to the reaction, for example, pH modifiers, catalysts, or organic solvents. The solubilized organic solute from the coal or other organic solid leaves the reactor 200 from a port 108 and enters a chiller 140 (if needed). The effluent from a port 110 can be monitored for the presence of solubilized organic solute or can be collected for further processing or analysis. The disclosed process can be batch, semi-continuous, or continuous.

Figure 2:
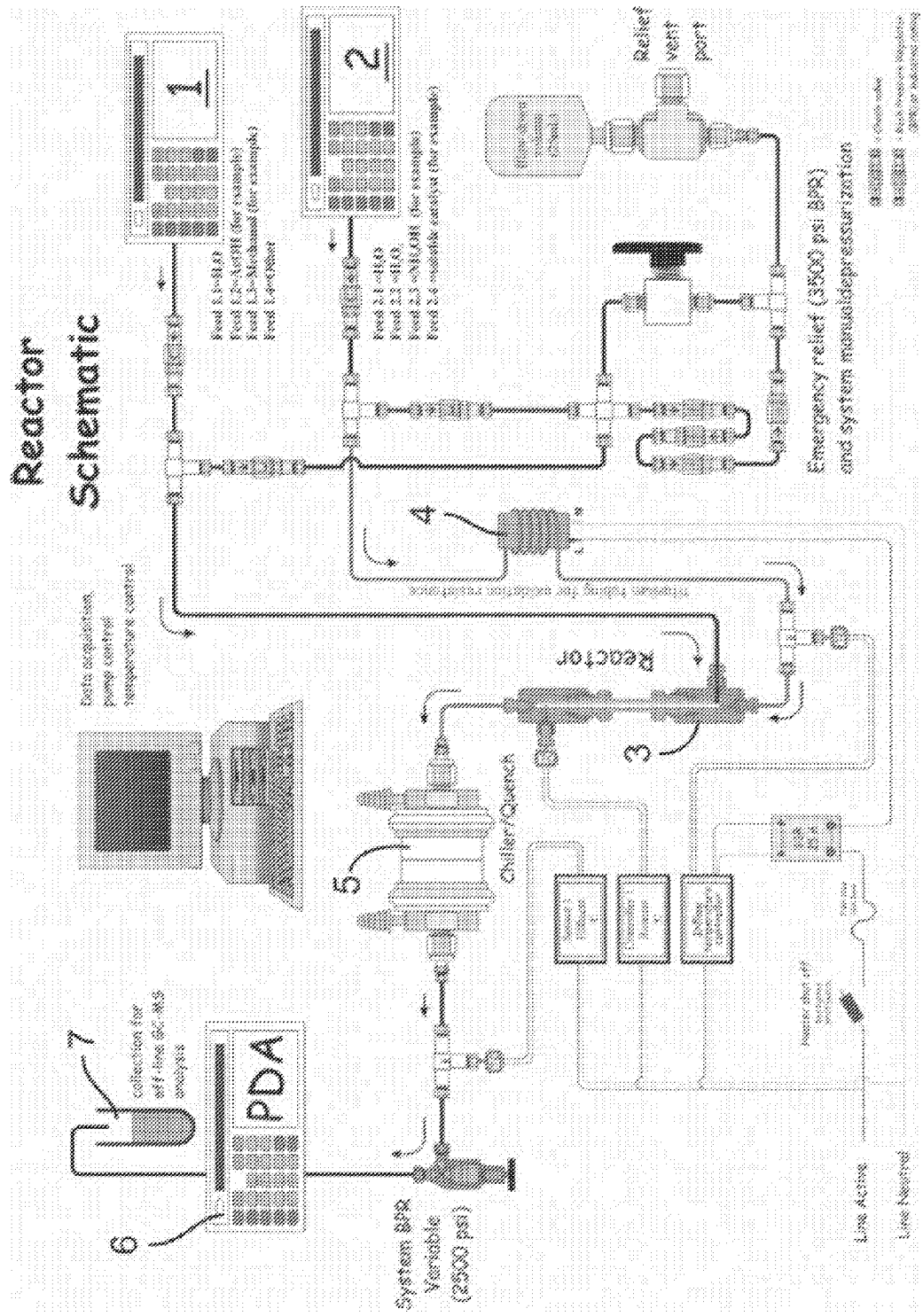
FIG. 2 is a detailed schematic of a micro-scale hydrothermal reaction system.

An example of a process system diagram can be found in FIG. 2. An organic solid is loaded into a reactor 200. An oxidant and superheated water are flowed into the reactor 200 by a pump 202. If the oxidant is molecular oxygen, derived from hydrogen peroxide, hydrogen peroxide is decomposed in a heater 204, and molecular oxygen and superheated water enter the reactor 200. Additional components or water can be flowed into the reactor 200 by a pump 206. A reaction between the organic solid and the oxidant takes place in the reactor 200 and generates a solubilized organic solute. The solubilized organic solute leaves the reactor 200 and enters a chiller 208 (if needed). Effluent is collected in a vessel 210, and data are collected by a detector 212.

Figure 3:
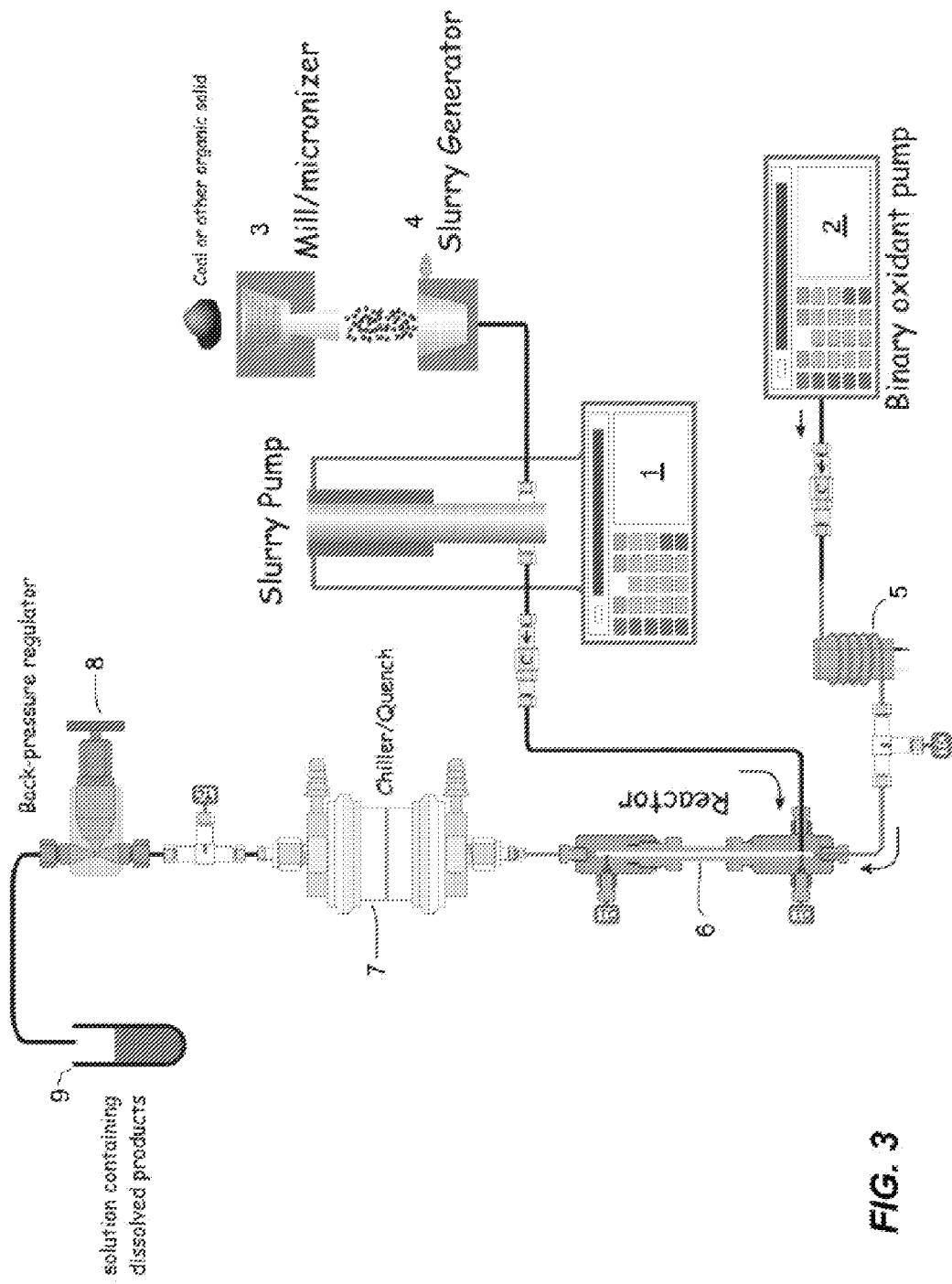
FIG. 3 is an alternative schematic of the hydrothermal reaction system that can operate continuously.

Another example of a process system diagram can be found in FIG. 3. Coal or other organic solid is pulverized in a mill 302 and combined with water to form a slurry in a slurry generator 304. The mill 302 and the slurry generator 304 can be combined into a single operation by wet milling. The slurry is then pumped into a reactor 306 by a slurry pump 308. The slurry can be heated before entering the reactor 306. An oxidant, such as molecular oxygen, and superheated water are flowed into the reactor 306 by a pump 310. If the molecular oxygen is derived from hydrogen peroxide, hydrogen peroxide is decomposed in a heater 312 and molecular oxygen and superheated water enter the reactor 306. A reaction between the organic solid and the oxidant takes place in the reactor 306 and generates a solubilized organic solute. The solubilized organic solute leaves the reactor 306 and enters a chiller 314 (if needed). Back pressure is controlled by a back-pressure regulator 316. Effluent is collected in a vessel 318. Wiring and control details have been omitted, but are implicit in the design of the reactor system. This system may be operated continuously.

Figure 4:
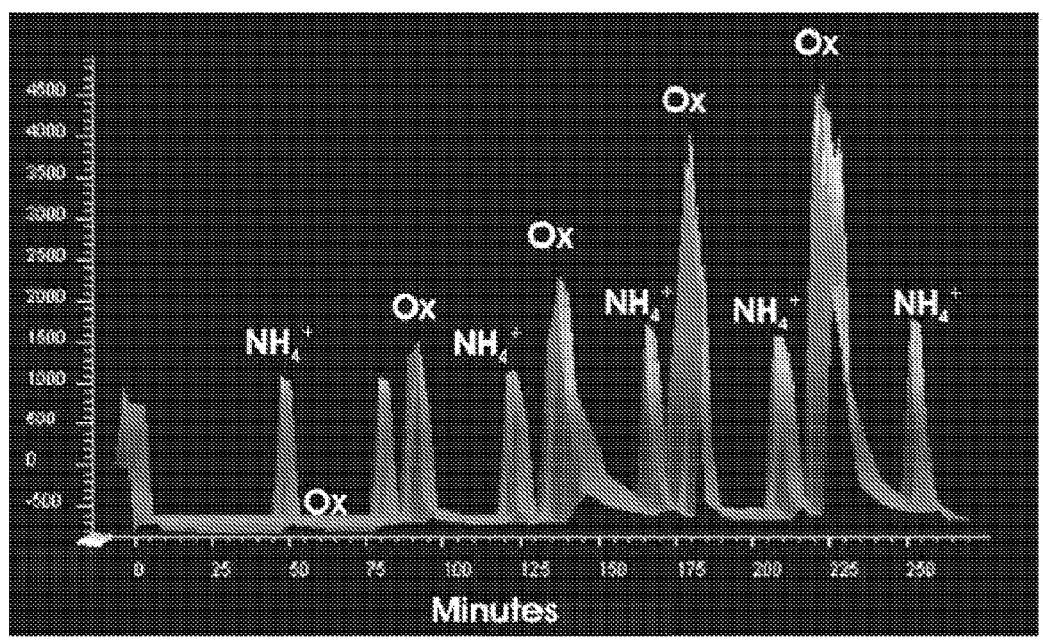
FIG. 4 is an absorbance spectrum over time for a solubilized organic solute from Illinois coal by the disclosed process under different oxidant loading.

FIG. 4 is an absorbance spectrum over time for solubilized organic solute from Illinois #6 coal. The peaks indicate that something that absorbs UV light is coming out of the reactor and the depth of the peaks (Z axis) indicates the nature of the product being detected. FIG. 4 demonstrates that with no added oxidant, exposure of coal to hydrothermal conditions resulted in no reaction, as indicated by the absence of measurable detector response products prior to the introduction of oxidant and for the blank (0%) oxidant at pulse 1. That is, no product was solubilized with hydrothermal water alone. With increasing oxidant loading, however, increasing amounts of coal are dissolved and released as soluble lower molecular weight products. The detector response was approximately proportional to the yield of product released with each oxidant pulse and was approximately directly proportional with oxidant loading. Ammonium ion ($NH_4^+$) was introduced between oxidant pulses to ensure that acidic products were fully purged from the system before each successive oxidant pulse. However, it has been found that ammonium ion pulsing is not necessary to achieve accurate measurements. These data in FIG. 4 indicate that the degree of solubilization of the coal was directly proportional to oxidant loading. The absence of significant "tailing" following each oxidant pulse indicates that the reaction between the coal and oxidant, and consequent release of solubilized products, was very rapid and complete on the order of the contact time between oxidant and organic solid (coal) used in these experiments (more than approximately 10 seconds).

The degree of dissolution of the coal can be controlled by variation of the oxidant loading and the time of exposure of the coal to oxidant, and can be taken to completion if desired. Complete dissolution of the coal or other organic solid can be readily achieved simply by continuing to react the coal or other organic solid for a sufficient period. At the micro-scale used for these experiments, complete closure of mass balances is difficult, but approximately 50% to approximately 90% of the mass dissolved from the coal is recoverable as solubilized product. Approximately 50% to nearly all of biomass is recoverable as solubilized product. Preferably, more than 50% of the organic solid is recoverable as solubilized organic solute, and more preferably, more than 70%, more than 80%, more than 85%, more than 90%, more than 95%, or more than 96% of the organic solid is recoverable as solubilized organic solute.

Without limiting the invention to any particular theory, it is believed that the process works by mild partial oxidation of the coal under hydrothermal conditions and is a progressive etching of the coal surface, rather than oxidation throughout the volume of the coal. This differs from oxidation of coal by gaseous oxygen ($O_2$). Conventional oxidation of coal by gaseous oxygen results in formation of a high reflectance rind (observed as a bright rim around the oxidized coal particles by optical microscopic analysis). This rind increases in thickness with increasing severity of oxidation. Formation of this rind indicates that the reaction of the coal with gaseous oxygen is a diffusion-limited process. Without being bound by theory, it is believed that the absence of such a rind in the products formed by the disclosed methods indicates that the oxidant reacts rapidly with the surface resulting in immediate release of products to the liquid phase and exposing essentially "fresh" coal for further reaction.

Figure 5:
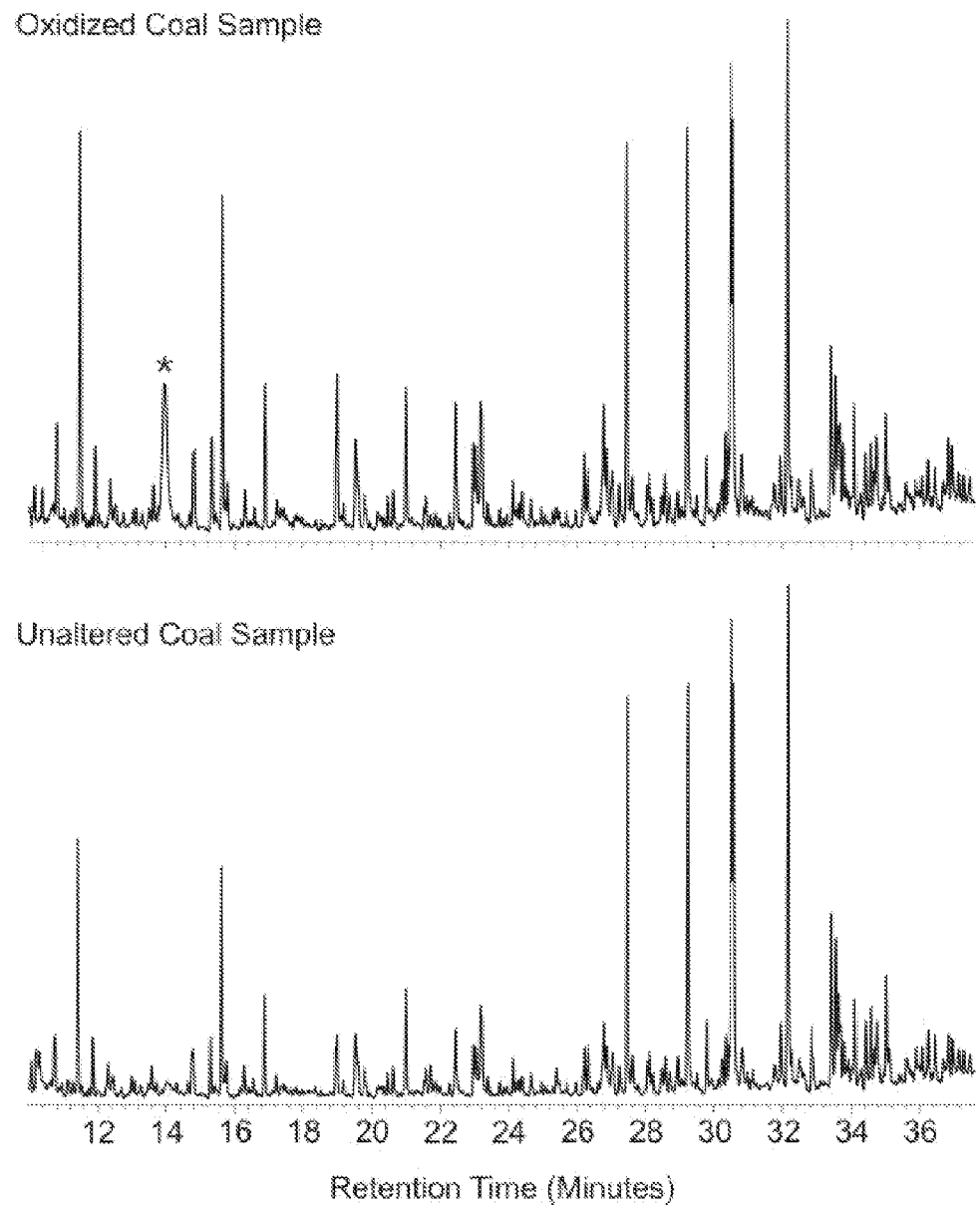
FIG. 5 includes pyrolysis-gas chromatographic analyses for fresh coal and residual unreacted coal.

This observation is supported by pyrolysis-gas chromatographic analyses shown in FIG. 5. These data compare the distribution of volatile products released by flash pyrolysis of fresh and residual unreacted coal. Despite exposure of the residual unreacted coal to oxidative conditions, the distributions of products observed are essentially identical, indicating that the residual unreacted coal is essentially unaltered compared to fresh coal. This indicates that material dissolved by the disclosed oxidation reactions is rapidly solubilized under hydrothermal conditions and removed from the system in the liquid phase, exposing essentially fresh coal for further reaction. The asterisk (*) on one peak of the chromatogram signifies an instrumental contaminant known as column bleed.

Figure 6:
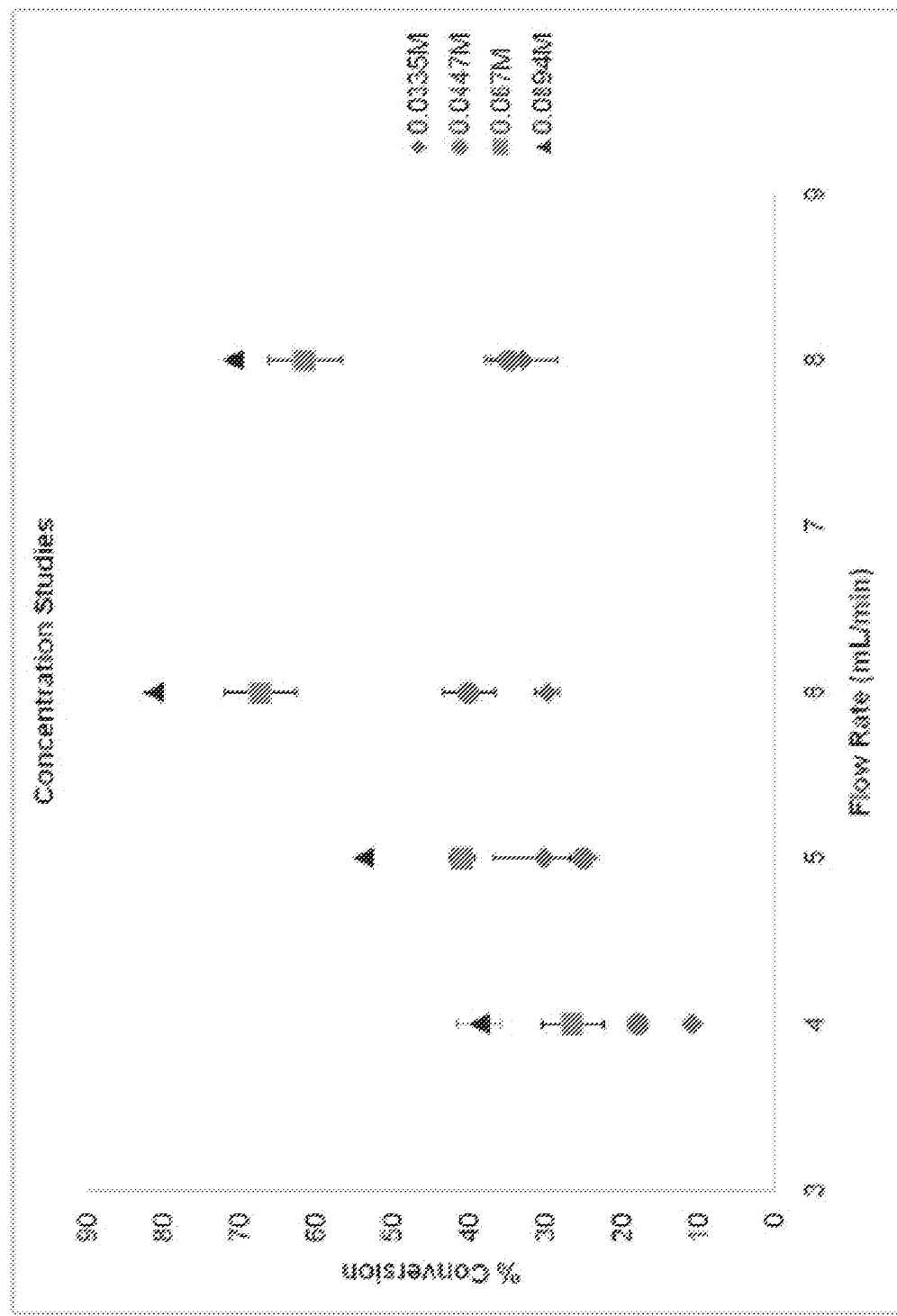
FIG. 6 is a concentration study of the disclosed process with various flow rates and oxidant concentrations.

With reference to FIG. 6, an optimal flow rate can be observed. For coal oxidation according to the disclosed process, at a temperature of 250° C., four oxidant ($O_2$) concentrations were studied: 0.0335 M, 0.0447 M, 0.067 M, and 0.0894 M. Various flow rates for superheated water were tested with a contact time of 4 minutes. The optimum observed in this figure reflects the optimum contact time between the oxidant and the coal. Across the range of oxidant concentrations tested, at low delivery rates, the rate of reaction is limited by the rate of delivery of the oxidant. At high flow rates, however, the rate limiting step is the inherent rate of reaction of the coal with the oxidant. At high flow rates, a significant proportion of the supplied oxidant is flushed out of the reactor before it has an opportunity to react with the coal. Preferred $O_2$ concentration and flow rate for this system are in the following ranges: $O_2$ concentration from about 0.005 M to about 0.1 M; flow rate from about 3 mL/min to about 9 mL/min. However, it is contemplated that optimum $O_2$ concentrations and flow rates for various systems can be ascertained with minimal experimentation.

These concentrations and flow rates may vary widely depending on reactor configuration and for organic solids other than coal. For example, adding an oxidant, such as $O_2$, during solubilization of biomass can increase solubilization rates compared with superheated water with no oxidant. Lignocellulosic biomass, such as wood or grass, will partially hydrolyze in superheated water to soluble lower molecular weight products. Wood is higher in lignin than grass and typically gives correspondingly lower yields when treated in water alone. However, addition of a minimal amount of oxidant increased solubilization rates. Oxidant concentrations in superheated water for biomass, such as wood, are preferably at least 0.005 M, at least 0.009 M, at least 0.015 M, at least 0.018 M, or at least 0.02 M of $O_2$.

The disclosed processes demonstrate variability depending on the macerals of the coal. Macerals are physical organic components of coal that are derived from discrete original plant tissues (in some cases modified by oxidation or charring). Macerals have distinct structural characteristics that reflect their derivation from distinct biopolymeric precursors. Individual macerals are derived from specific plant tissues. For example, sporonite is derived from the outer cell walls of spores and pollens. Cutinite is derived from plant cuticle; resinite is derived from plant resins. Vitrinite is derived from woody plant tissues and is generally the major maceral in most coals. Fusinite and semifusinite are macerals that are derived from plant tissues that have been subjected to charring during deposition of the original plant tissues.

Macerals are identified by microscopic analysis of polished coal sections. Individual macerals are identified on the basis of reflectivity, fluorescence and morphology. On this basis, and on the basis of reactivity during processing or utilization, macerals are generally classified into one of three major maceral groups. Hydrogen-rich, low density, low reflectivity (and highly fluorescing) macerals, including sporinite, cutinite, resinite, and others, are grouped as liptinites. Vitrinite is its own maceral and maceral group (and is sometimes sub-divided into narrower classification based on morphology). Highly reflecting, low fluorescence macerals, including fusinite, semi-fusinite, and others, are grouped as inertinites (because they are relatively inert in some processes, especially manufacturing of coke for steel production). It was found that the reactivity of the macerals varies when subjected to the disclosed process. Although all macerals are solubilized by the disclosed process, it was found that liptinite was more reactive than vitrinite, and vitrinite was more reactive that inertinite. Therefore, it is contemplated that all types of coal can be solubilized using the disclosed process.

The solubilized organic solutes of the disclosed processes are dissolved products in aqueous solution. For coal, the pH of this solution is typically low (pH of 1-5, preferably 2-3) most likely due to the presence of sulfuric aid derived from oxidation of pyrite that was normally present in the coal used for this investigation. The low pH ensures that organic acids present are in the fully protonated form. Several analytical approaches have been used to investigate this mixture of products.

Figure 7:
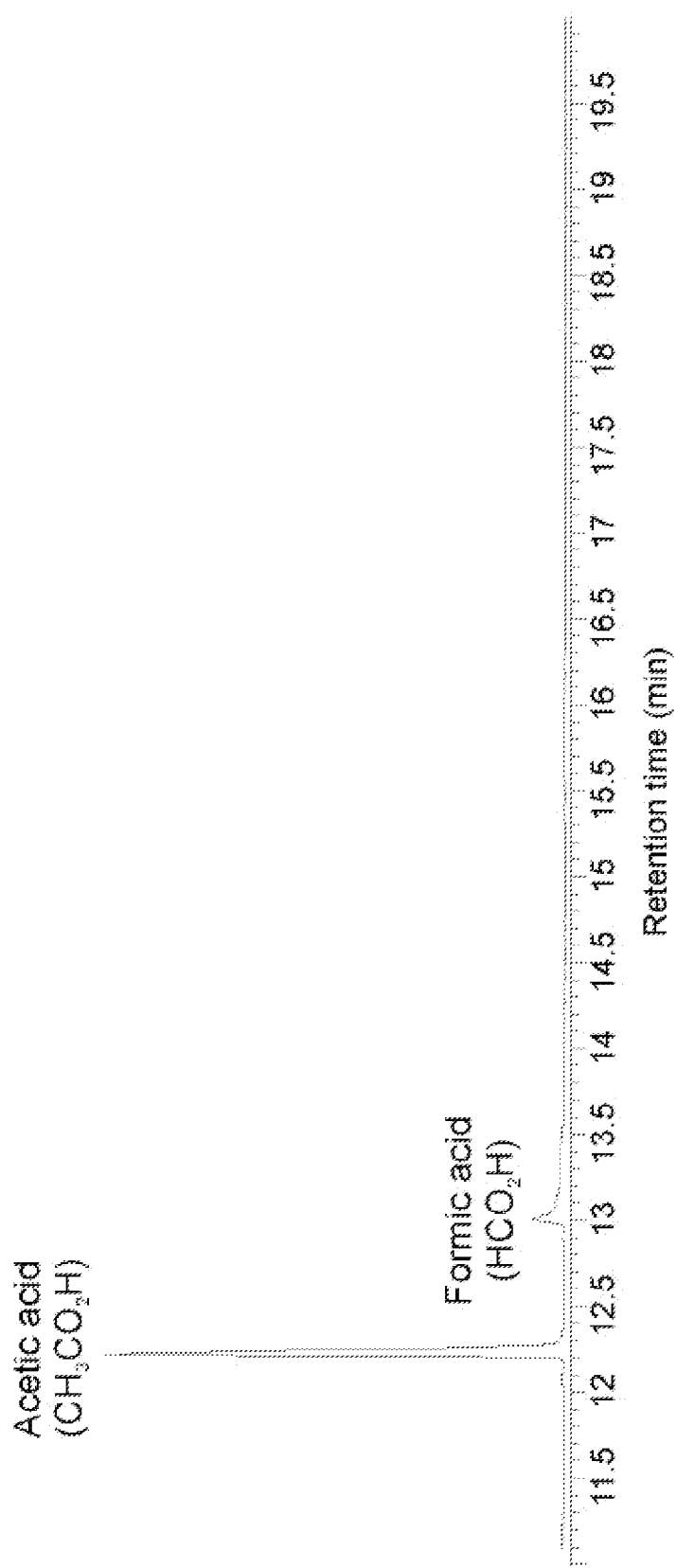
FIG. 7 is a gas chromatograph-mass spectrometry analysis of an aqueous solution containing a solubilized organic solute.

Volatile low molecular weight organic acids, primarily formic acid ($HCO_2H$) and acetic acid ($CH_3CO_2H$) are present in the aqueous solution as indicated by direct gas chromatograph-mass spectrometry analysis of the aqueous product with no additional separation as shown in FIG. 7. This result is entirely consistent with the proposed mechanism for this process, which involves oxidative cleavage of aliphatic (and other) cross-linking groups primarily by oxidation of benzylic structures. These products are typically lost during work up of the aqueous solution due to volatility and are not observed in the data of FIG. 6 for that reason.

The majority of the solubilized organic solutes comprise a complex mixture of compounds that at present remains only partially characterized. For example, solubilized organic solutes may include monoaromatic structures with 2 to 4 functional groups (predominantly COOH and phenols) and aliphatic products, such as formic and acetic acids and polyfunctionalized C4-C7 products. Specifically, for example, solubilized organic solutes from coal include butenedioic acid, butanedioic acid, methyl butanedioic acid, benzoic acid, thiophene carboxylic acid, pentanedioic acid, dimethoxy benzene, hexanedioic acid, furan dicarboxylic acid, trimethoxybenzene, methoxy benzoic acid, heptanedioic acid, propanetricarboxylic acid, benzene dicarboxylic acid, thiophene dicarboxylic acid, methoxy benzene dicarboxylic acid, benzene tricarboxylic acid, benzene tetracarboxylic acid, C14 fatty acid, C16 fatty acid, and C18 fatty acid. Some of these compounds are useful as chemical feedstocks for polymer manufacturing or as precursors for other products, including fuels. Other compounds are analogous to products currently used as chemical feedstocks, and thus, are potentially useful for polymer manufacturing. Isolation of the solubilized organic solutes from the aqueous phase for identification has proven surprisingly difficult due to the wide range of polarity and volatility of the compounds in the aqueous solution. Isolation procedures based on solvent extraction have been developed and broad characteristics of the product have been established.

Figure 8:
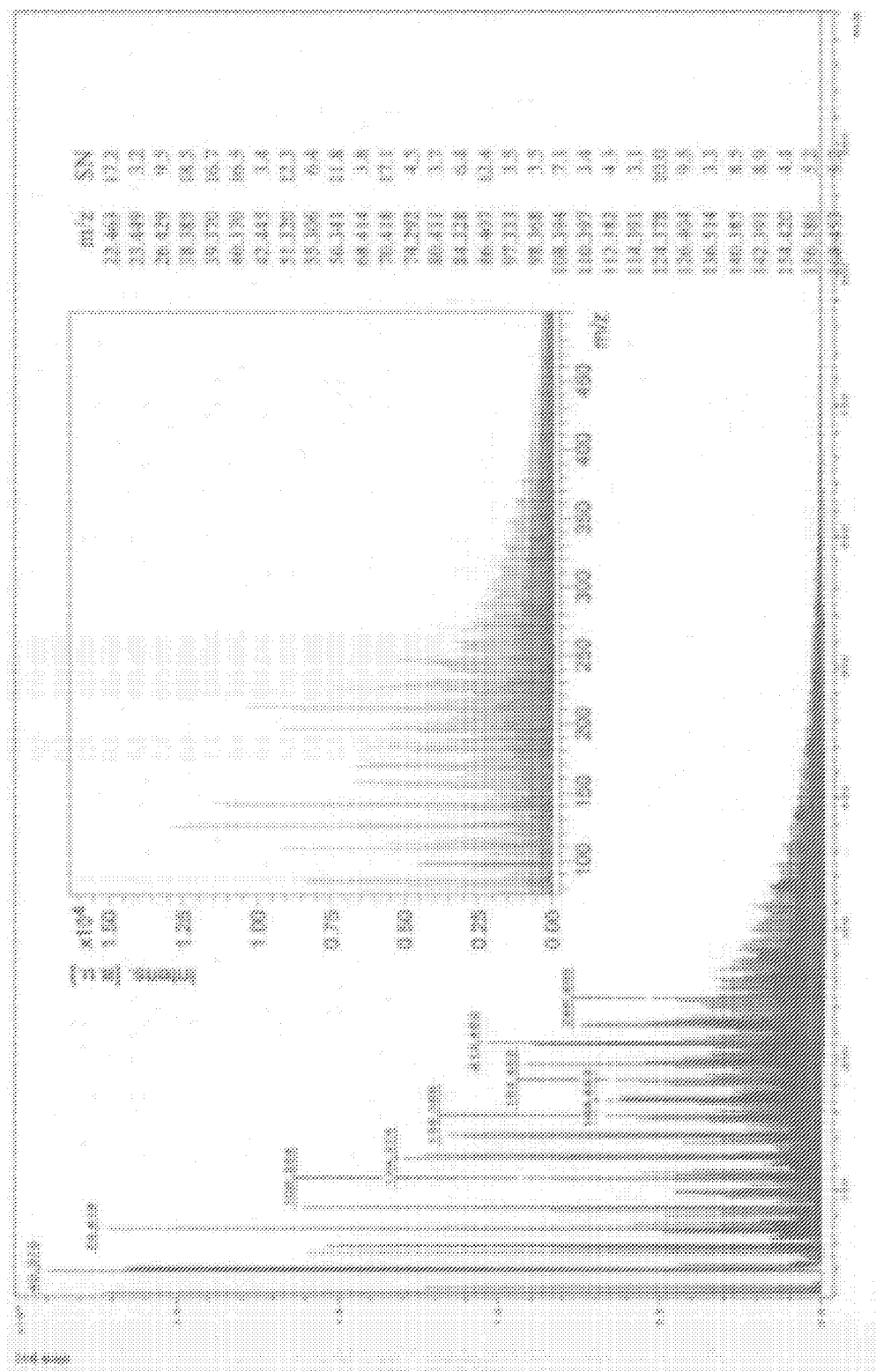
FIG. 8 is a laser desorption mass spectrometry analysis of a solubilized organic solute.
Figure 9:
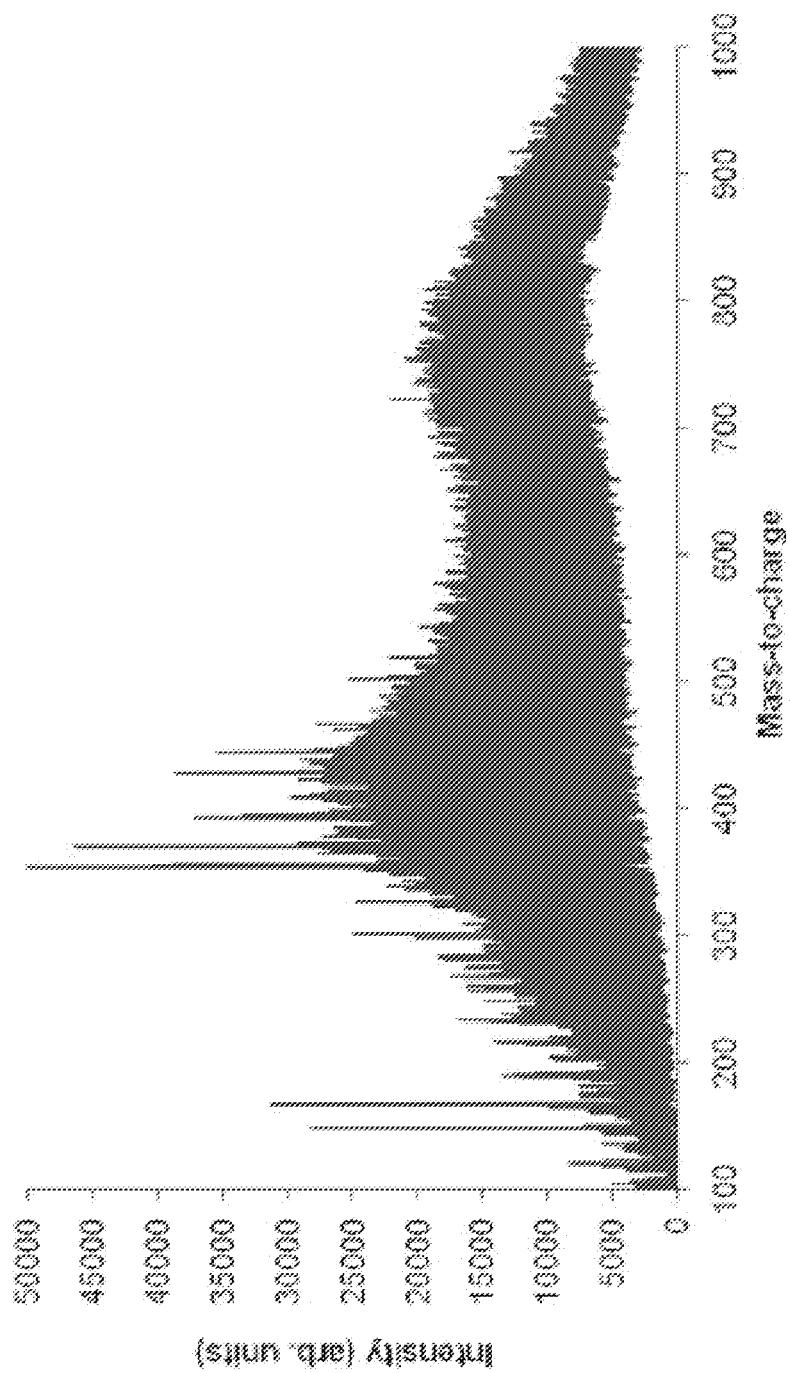
FIGS. 9-11 are electrospray ionization mass spectrometry analyses of a solubilized organic solute.
Figure 10:
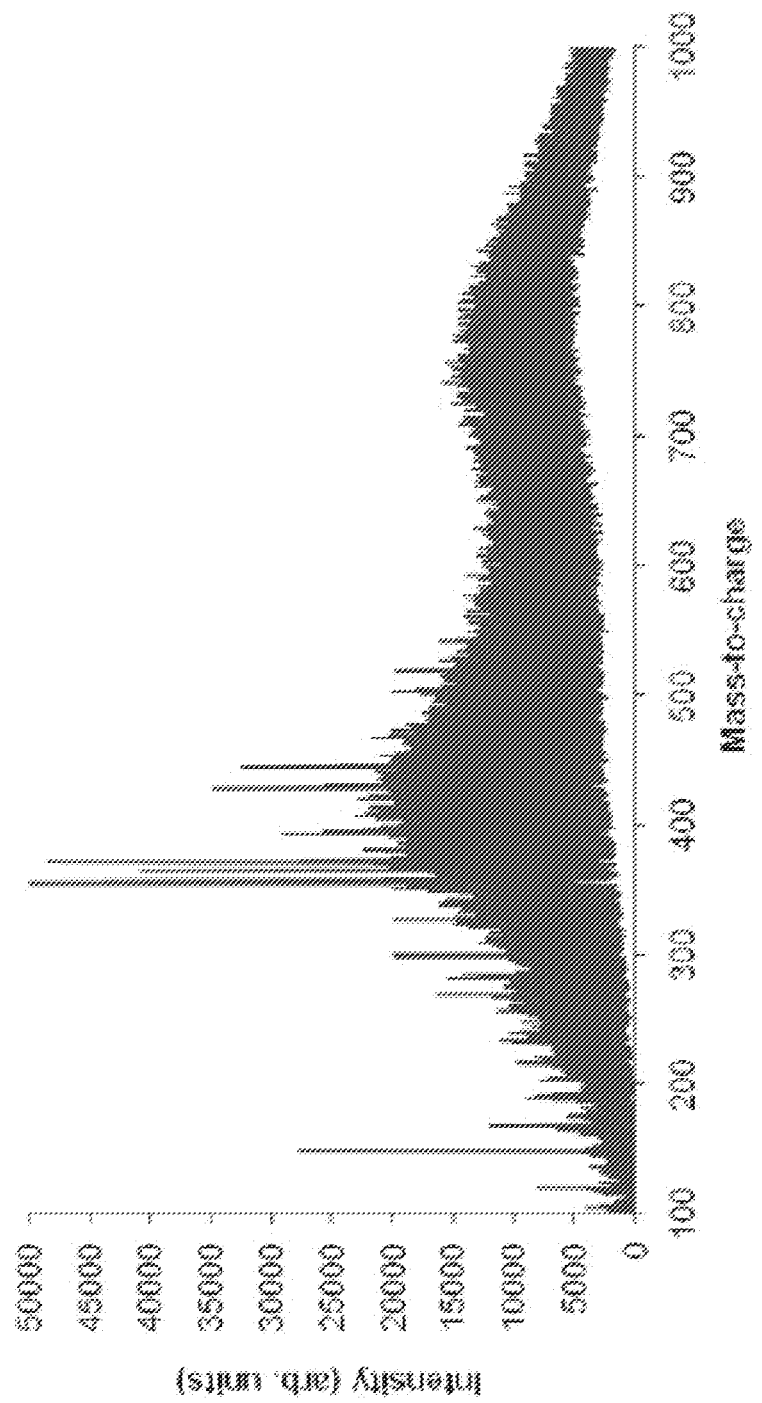
Figure 11:
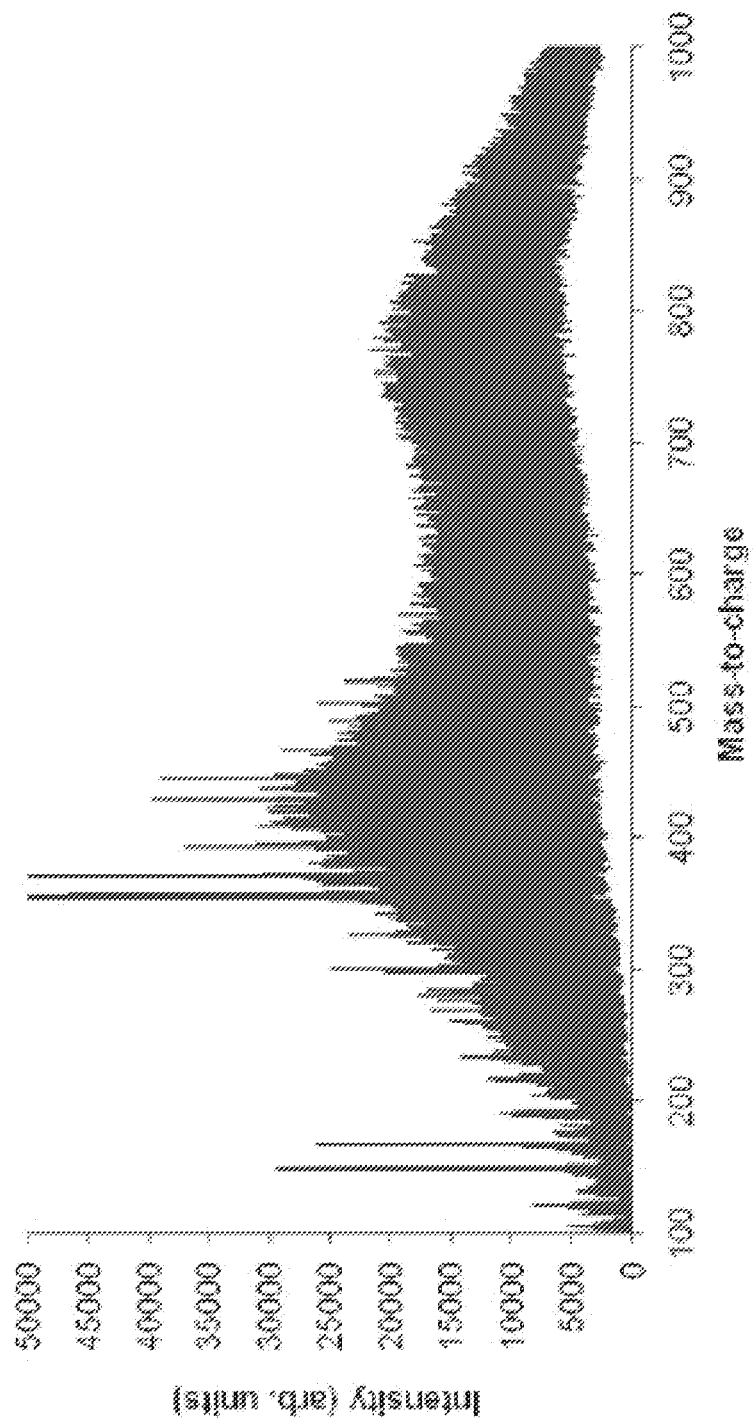

The resultant product was analyzed using laser desorption mass spectrometry (LDMS) and electrospray ionization mass spectrometry (EIS-MS). With reference to FIG. 8, the LDMS data indicate a large molecular weight distribution of approximately 200 atomic mass units (amu) to approximately 500 amu for the solubilized organic solutes, with a peak at approximately 400 amu. With reference to FIGS. 9-11, the EIS-MS data indicate a bimodal product distribution with maxima at approximately 400 amu and approximately 800 amu. It is probable that the second maximum at approximately 800 amu is an artifact of the ionization procedure known as molecular clustering, wherein a neutral product forms a loose association (usually H-bonding) with a charged product and the resulting "cluster" is detected as a combined mass. This is consistent with the absence of a peak at approximately 800 amu in the LDMS data.

The disclosed methods also generate gaseous products. These gases are a relatively minor product, with the majority of the organic solid present as solubilized organic solute in the water. Carbon monoxide (CO) is the major gaseous product. However, with increasing temperatures, the level of carbon dioxide ($CO_2$) increases. At 225° C., the $CO/CO_2$ ratio is consistently around 40. At 250° C., the $CO/CO_2$ ratio decreases to 20, and at 300° C., the ratio approaches 8. Thus, it is believed that CO is being oxidized to $CO_2$ at higher temperatures.

The underlying chemistry of the process is similar to other coal oxidation strategies in that it uses an oxidant to break down the macromolecular structure of the coal into lower molecular weight fragments. However, the process disclosed herein uses water as a reaction media and solvent, and therefore, avoids the use of expensive and potentially toxic solvents. In addition, the use of molecular oxygen as an oxidant avoids the use of exotic oxidants. The use of water and molecular oxygen, preferably from air, in the process also reduces the cost of production, especially for large scale production. Finally, unlike direct coal liquefaction, the disclosed processes do not require the use of highly flammable hydrogen gas.

Overall, the process disclosed herein is an environmentally benign process to solubilize coal which can be processed to derive valuable fuels or chemical feed stocks. It is contemplated that the solubilized organic solutes derived from the disclosed processes are bioavailable. Therefore, the biodegradation of the solubilized organic solutes may occur readily in natural systems, which minimizes the environmental risks associated with the disclosed processes.

Solubilizing the organic solids also provides the advantage of increased ease of processability. The resultant liquid can be pumped and further processed using conventional liquid processing technologies.

EXAMPLES

Micro-scale reaction system: With reference to FIG. 2, the following examples were performed on the micro-scale hydrothermal reaction system. The system includes twin quaternary pumps 202 and 206, which provide accurate control of up to eight separate liquid feeds, coupled to a simple up-flow high pressure reactor 200. Feed from a pump 202 is heated via a heater 204 to hydrothermal conditions before entering the reactor 200. Another pump 206 is used to deliver modifiers and to quench the reaction, when desired, by rapid introduction of unheated water. In a typical experiment, coal (10-100 mg) or other organic solid, is loaded into the reactor 200, which is then brought to hydrothermal conditions, for example, 250° C. and about 1800 psi to about 2200 psi. Oxygen is then introduced into the reactor 200 and allowed to react with the coal or other organic solid. For example, molecular oxygen is produced in situ by thermal decomposition of hydrogen peroxide, prior to mixing of the feed with the coal or other organic solid. This provides accurate and consistent control of $O_2$ loading and avoids the necessity of gas/liquid mixing, which would be very difficult to achieve accurately and consistently at the micro-scale. The design allows water, oxidant, and modifiers, such as catalysts, pH modifiers, and/or organic solvents, to be introduced to the coal or other organic solid in any proportion with accurate control of the timing of delivery. The reactor 200 includes a simple up-flow body with an internal volume of 0.25 mL (compatible with available pumps), operated in an up-flow configuration with no gaseous head space, eliminating phase equilibrium considerations. The product from the reactor can be chilled in a chiller/quencher 208 and passed through a photo diode array detector 212 (multi-wavelength UV absorption) to monitor yield and gross product characteristics. Effluent is also collected in a vessel 210 for additional further analysis. Any unreacted coal or other organic solid, if any, is collected and characterized.

Figure 12:
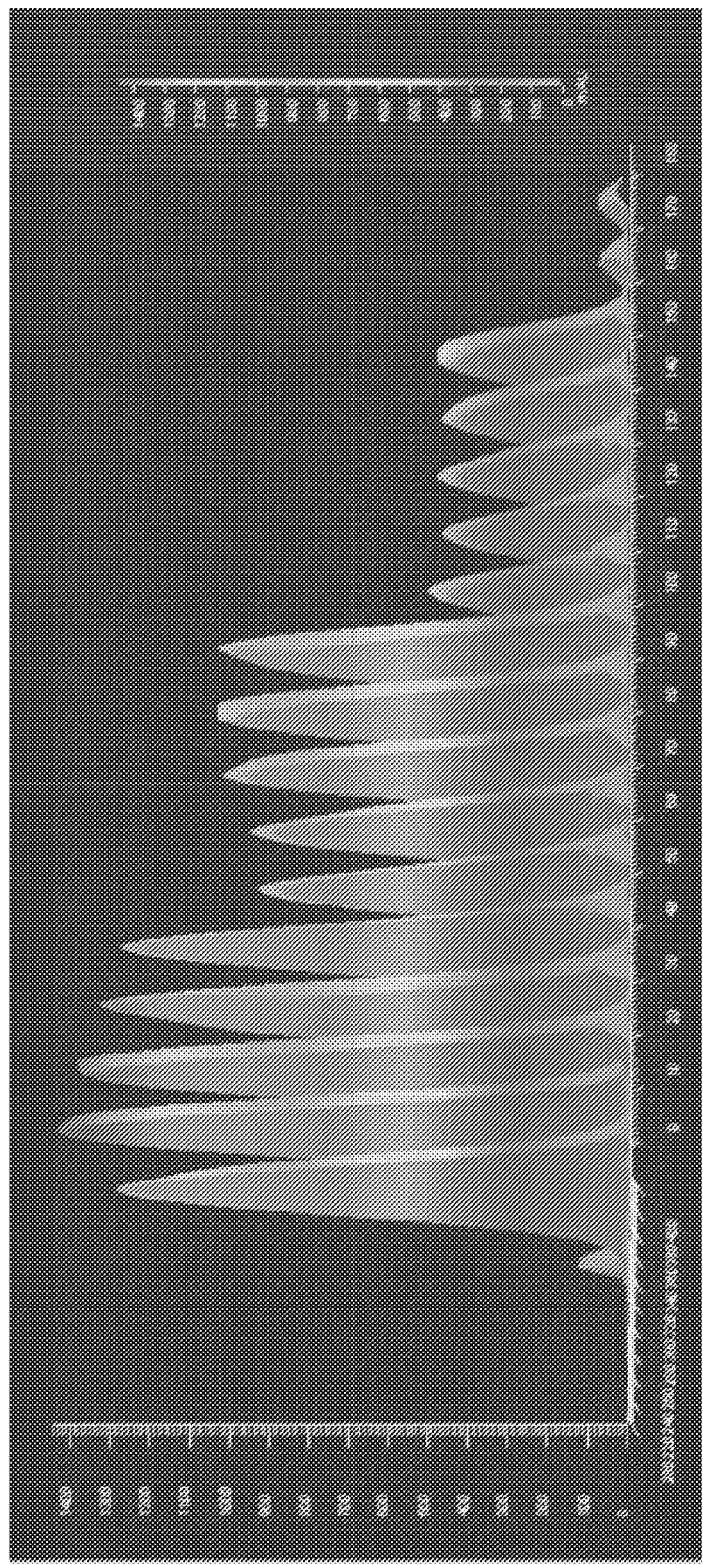
FIG. 12 is a detector response for micro-scale reaction system performance tests; and, FIG. 13 is a comparison of biomass conversion using superheated water at various temperatures with and without an oxidant.

Accurate and precise control of the composition of the reactor feed is readily achieved. FIG. 12 demonstrates control and reproducibility of designed pulses of reagent delivered through the reactor. The data illustrated represent fifteen pulses of reference materials sent as three groups of five replicates at successive levels of dilution. The results obtained from experiments run on the micro-scale indicate (i) that the reactor exhibits near plug flow characteristics (successive pulses are well separated with little evidence of dead or mixing volume in the system), (ii) that automatic control of feed composition works as designed, and (iii) that detector response is close to linear over the range of interest. Reactor residence times achieved using this system are of the order of approximately 10 seconds, after which the effluent, including solubilized products, is rapidly quenched to approximately 20° C. to prevent further oxidation of the product.

Example 1

Illinois #6 coal (40 mg with particles smaller than a sieve size of 40 openings per inch and larger than a sieve size of 80 openings per inch) was loaded into the reactor system of FIG. 2. A small amount of glass wool was placed on top of the coal to keep particulates from clogging the reactor 200. Flow (1.8 mL/min of deionized (DI) water in pump 202, 0.2 mL/min of heated DI water in the pump 206) was established and the system was brought to operating temperature (250° C.) and allowed to equilibrate/stabilize (45 minutes). Back pressure of about 1800 psi to about 2200 psi (about 12 MPa to about 15 MPa) was maintained by means of fixed and variable high performance liquid chromatography (HPLC) back pressure regulators. After equilibration, 0.2 mL/min of 3% $H_2O_2$ was introduced to the reactor from the pump 206, resulting in 0.0635 M $O_2$ per minute. This flow may be delivered either continuously or as timed pulses. Reactor effluent was continuously monitored by photo diode array (PDA) detection by detector 212 and collected for further analysis. At completion of the experiment, the heat was turned off and the system allowed to cool. Flow was maintained until the system cooled to room temperature.

Example 2

Illinois #6 coal (40 mg with particles smaller than a sieve size of 40 openings per inch and larger than a sieve size of 80 openings per inch) was loaded into the reactor system of FIG. 2. A small aluminum plug was loaded on top of the coal to keep particulates from clogging the reactor 200. Flow (0.6 mL/min of DI water in the pump 206, 5.4 mL/min of heated DI water in the pump 202) was established and the system was brought to operating temperature (250° C.) and allowed to equilibrate/stabilize (23 minutes). Back pressure of about 1800 psi to about 2200 psi (about 12 MPa to about 15 MPa) was maintained by means of fixed and variable HPLC back pressure regulators. After equilibration, 0.5832 mL/min of 3% $H_2O_2$ was introduced to the reactor 200 from the pump 202, resulting in 0.0617 M $O_2$ per minute. Reactor effluent was continuously monitored by PDA detection by detector 212 and collected for further analysis. At completion of the experiment, the heat was turned off and the system allowed to cool. Flow was maintained until the system cooled to room temperature.

Example 3

Experiments on biomass were performed with brewery grain, wood, and corncobs in the reactor system of FIG. 2. Each type of biomass was tested multiple times at a reaction temperature of 250° C. and an oxidant concentration of 0.004 M $O_2$. Water flowed into the reactor at 6 mL/min. Each reaction proceeded for 10 minutes. Brewery grain was tested at six weights: 42 mg, 45 mg, 50 mg, 50 mg, 55 mg, and 60 mg. Wood was tested at four weights: 6 mg, 21 mg, 50 mg, and 50 mg. Corncobs were tested at four weights: 50 mg, 50 mg, 70 mg, and 100 mg. All reactions resulted in complete conversion of the biomass into solubilized organic solute.

Example 4

Figure 13:
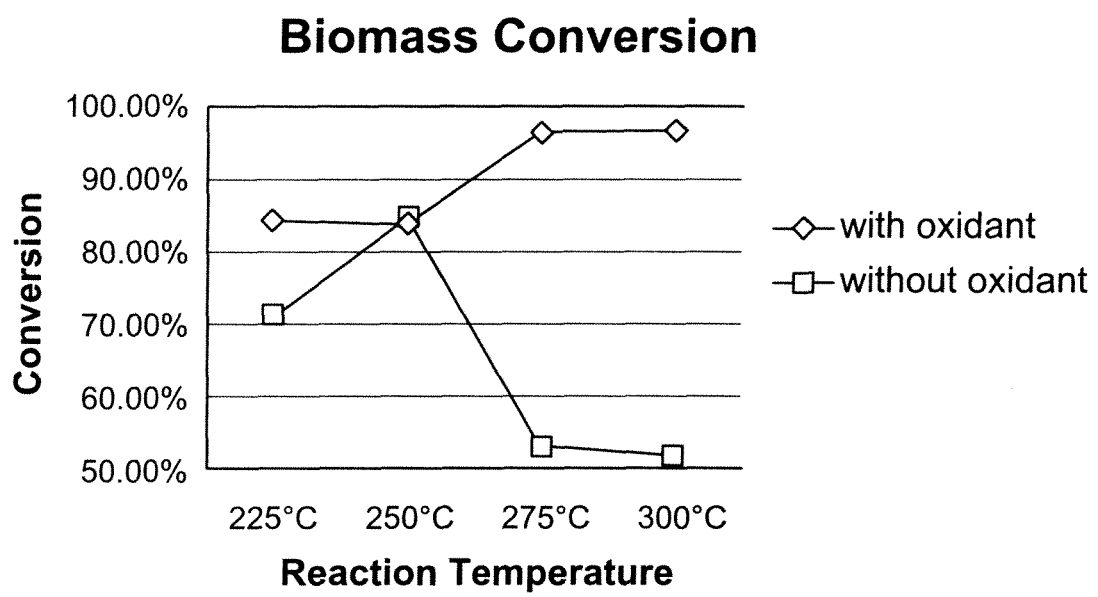

Experiments on biomass were performed with wood, i.e., saw dust, in the reactor system of FIG. 2. 100 mg of Ponderosa Pine saw dust was tested at multiple reaction temperatures, 225° C., 250° C., 275° C., and 300° C., with and without an oxidant. Water flowed into the reactor at 10 mL/min. The oxidant was pulsed for 10 minutes at a concentration of 0.009 M. The entire reaction lasted 45 minutes, including 20 minutes to heat the reactor to achieve steady-state and 15 minutes of water-only flow to cool the reactor. The reaction pressure was maintained at 2000 psi using a back pressure regulator. As shown in FIG. 13, reactions without an oxidant did not achieve full conversion of the biomass. Further, with increasing temperature, the conversions of biomass with an oxidant were nearly complete. Without an oxidant, optimum conversion of the biomass was at 250° C. See Table 1 below for conversion rates at various temperatures with and without an oxidant. At 275° C. and 300° C., the oxidant increased conversion rates, including conversion of the lignin, which is typically more resistant to dissolution

TABLE 1

Conversion rates (FIG. 13)

| Temperature (° C.) | Conversion rates (%) | |
| --- | --- | --- |
| | Without oxidant | With oxidant |
| 225 | 71.4 | 84.6 |
| 250 | 85 | 83.9 |
| 275 | 53 | 96.3 |
| 300 | 52 | 96.7 |

Example 5

Maceral Reactivity

Three maceral groups were selected for testing the variability in reactivity: inertinite, liptinite, and vitrinite. Specifically, see Table 2 below for the tested macerals.

TABLE 2

Macerals studied in reactivity experiment

| Sample | Primary Maceral | Maceral Group |
| --- | --- | --- |
| Fusain | Fusinite | Inertinite |
| Breckenridge Cannel | Sporinite | Liptinite |
| Alpha Torbanite | Alginite | Liptinite |
| Illinois #6 | Vitrinite (~70%) | Vitrinite |

The following samples are in order of decreasing reactivity: Breckenridge cannel, Illinois #6, Alpha torbanite, and Fusain. Therefore, the maceral group liptinite was generally the most reactive, with vitrinite and inertinite following.

Testing of Solubilized Organic Solute

Effluent from the reactor was acidified (12M HCl, 3-4 drops), saturated with sodium chloride (NaCl), and extracted with tetrahydrofuran (THF) (30-50 mL) three times. The resultant organic layer was filtered through a 0.45 micrometer Teflon membrane to recover THF-insolubles, dried over $MgSO_4$, and concentrated by rotary-evaporation ("rotovap"). The resultant product(s) were then analyzed to determine the chemical composition of the organic product.

A preferred testing method follows: The product from the disclosed reaction was brined and extracted with THF. An excess of magnesium sulfate was added to further dry the organic phase. The mixture was filtered through a medium glass frit, and the filtrate was retained. The organic phase was then concentrated to approximately 5 mL using a rotary evaporator (rotovap) at 50° C. Approximately 95 mL of pentane was added to the concentrated organics under vigorous stiffing causing the pentane insoluble organics to precipitate from solution. The mixture was filtered through a 0.45 micrometer Teflon membrane. The filter cake was dried in a vacuum oven at about 50° C. to about 60° C. for about 8 hours to about 12 hours to remove any remaining THF. The dry solid can be analyzed using pyrolysis-gas chromatography/mass spectrometry (PY-GCMS), solid state nuclear magnetic resonance (NMR) spectrometry, or other techniques as appropriate and desirable. Also, the solid can be suspended in methanol and methylated using boron trifluoride.

For example, 41.5 mg of Illinois #6 coal was subjected to the disclosed reaction with a temperature of 250° C., a flow rate of 6 mL/min, and a concentration of 0.067 M oxygen for 10 minutes. The solubilized organic product was saturated with sodium chloride (NaCl) and washed 4 times with 50 mL of THF. The organic phase was then dried by adding an excess of magnesium sulfate ($MgSO_4$). After filtration to remove the $MgSO_4$, the dry organic phase was concentrated using a rotovap at 50° C. 95 mL of pentane was added to the concentrated organics and stirred vigorously for 30 minutes to precipitate the insoluble organics. The mixture was filtered through a 0.45 micrometer membrane. The filter cake was dried in a vacuum oven at 60° C. for 12 hours. The final dry solid had a mass of 24.2 mg (62% recovery of product).

The foregoing examples demonstrate that the process is an effective method for solubilizing organic solids with high yields, minimal environmental impact, and/or fast reaction times.

The foregoing description is given for clearness of understanding only, and no unnecessary limitations should be understood therefrom, as modifications within the scope of the invention may be apparent to those having ordinary skill in the art.

What is claimed is:

1. A process for solubilizing an organic solid, the process comprising reacting an organic solid with an oxidant in superheated water to form at least one solubilized organic solute, wherein reacting the organic solid with the oxidant occurs in a reactor having no head space above the superheated water.

2. The process of claim 1, wherein the oxidant is molecular oxygen ($O_2$).

3. The process of claim 2, wherein the molecular oxygen is derived from hydrogen peroxide.

4. The process of claim 1, wherein the temperature of the superheated water is above 100° C. to about 374° C.

5. The process of claim 1, wherein the temperature of the superheated water is about 200° C. to about 350° C.

6. The process of claim 1 comprising carrying out the reaction at a pressure of more than 100 Pa to about 22 MPa.

7. The process of claim 1 comprising carrying out the reaction at a pressure of about 1.5 MPa to about 17 MPa.

8. The process of claim 1 comprising carrying out the reaction at a pressure of about 12 MPa to about 16 MPa.

9. The process of claim 1, wherein the organic solid is selected from the group consisting of coal, lignite, kerogen, biomass, solid organic wastes, and mixtures thereof.

10. The process of claim 9, wherein the biomass is selected from the group consisting of wood, grasses, grains, other biological materials derived from living organisms and mixtures thereof.

11. The process of claim 1 further comprising chilling the solubilized organic solute.

12. The process of claim 11 comprising chilling the solubilized organic solute to about 20° C.

13. The process of claim 1, wherein the solubilized organic solute has a pH of about 1 to about 5.

14. The process of claim 1 comprising carrying out the reaction to completion.

15. The process of claim 1, wherein more than 50% of the organic solid is recoverable as the solubilized organic solute.

16. The process of claim 1, wherein more than 70% of the organic solid is recoverable as the solubilized organic solute.

17. The process of claim 1, wherein more than 90% of the organic solid is recoverable as the solubilized organic solute.

18. The process of claim 1, wherein more than 95% of the organic solid is recoverable as the solubilized organic solute.

19. The solubilized organic solute of the process of claim 1.

20. A process for solubilizing an organic solid, the process comprising reacting an organic solid with an oxidant in superheated water to form at least one solubilized organic solute,
wherein the organic solid is selected from the group consisting of coal, lignite, kerogen, biomass, and mixtures thereof, and
wherein the biomass is selected from the group consisting of wood, grasses, grains, other biological materials derived from living organisms, and mixtures thereof.

21. The process of claim 20, wherein the oxidant is molecular oxygen ($O_2$).

22. The process of claim 21, wherein the molecular oxygen is derived from hydrogen peroxide.

23. The process of claim 20, wherein the temperature of the superheated water is above 100° C. to about 374° C.

24. The process of claim 20, wherein the temperature of the superheated water is about 200° C. to about 350° C.

25. The process of claim 20 comprising carrying out the reaction at a pressure of more than 100 Pa to about 22 MPa.

26. The process of claim 20 comprising carrying out the reaction at a pressure of about 1.5 MPa to about 17 MPa.

27. The process of claim 20 comprising carrying out the reaction at a pressure of about 12 MPa to about 16 MPa.

28. The process of claim 20 comprising reacting the organic solid with the oxidant in a reactor having no head space above the superheated water.

29. The process of claim 20, further comprising chilling the solubilized organic solute.

30. The process of claim 29, comprising chilling the solubilized organic solute to about 20° C.

31. The process of claim 20, wherein the solubilized organic solute has a pH of about 1 to about 5.

32. The process of claim 20, comprising carrying out the reaction to completion.

33. The process of claim 20, wherein more than 50% of the organic solid is recoverable as the solubilized organic solute.

34. The process of claim 20, wherein more than 70% of the organic solid is recoverable as the solubilized organic solute.

35. The process of claim 20, wherein more than 90% of the organic solid is recoverable as the solubilized organic solute.

36. The process of claim 20, wherein more than 95% of the organic solid is recoverable as the solubilized organic solute.

37. The solubilized organic solute of the process of claim 20.

* * * * *